US009015806B2

(12) United States Patent
Song (10) Patent No.: US 9,015,806 B2
(45) Date of Patent: Apr. 21, 2015

(54) SENDING DIGITAL DATA VISUALLY USING MOBILE DISPLAY AND CAMERA SENSOR

(75) Inventor: Alex Tzu-Yu Song, San Jose, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 770 days.

(21) Appl. No.: 13/268,030

(22) Filed: Oct. 7, 2011

(65) Prior Publication Data

US 2013/0091548 A1 Apr. 11, 2013

(51) Int. Cl.
*G06F 7/04* (2006.01)
*H04W 12/02* (2009.01)
*H04W 12/04* (2009.01)
*H04W 12/06* (2009.01)

(52) U.S. Cl.
CPC .............. *H04W 12/02* (2013.01); *H04W 12/04* (2013.01); *H04W 12/06* (2013.01)

(58) Field of Classification Search
CPC ..... H04W 12/02; H04W 12/04; H04W 12/06; H04W 12/4011
USPC ............................................ 726/4, 28; 713/1
See application file for complete search history.

(56) References Cited

U.S. PATENT DOCUMENTS

| | | | | |
|---|---|---|---|---|
| 7,660,878 | B2 * | 2/2010 | Castaldi et al. | 709/221 |
| 2004/0233293 | A1 * | 11/2004 | Brumitt et al. | 348/207.1 |
| 2009/0196456 | A1 * | 8/2009 | Bisti et al. | 382/100 |
| 2011/0234829 | A1 * | 9/2011 | Gagvani et al. | 348/222.1 |
| 2012/0198531 | A1 * | 8/2012 | Ort et al. | 726/7 |

OTHER PUBLICATIONS

Claycomb et al, Secure Real World Interaction Using Mobile Devices, 2006, pp. 1-11.*
Banitsas et al, Using Handheld Devices for Real-Time Wireless Teleconsultation, Sep. 5, 2004, IEEE, pp. 3105-3108.*
Venzano, Applications of Dynamic Routing Algorithms on Wireless Networks in Harbour Environments, 2004, University of Genoa, pp. 1-75.*

* cited by examiner

*Primary Examiner* — Christopher Brown
*Assistant Examiner* — Jenise Jackson (57) ABSTRACT

A system for establishing a connection between a first device and a wireless network includes a first control module, located on the first device, that receives encoded digital data. The encoded digital data corresponds to a plurality of images displayed sequentially on a display of a second device. Each of the plurality of images corresponds to a different portion of the encoded digital data. A decoder module, located on the first device, converts the encoded digital data into configuration data. The configuration data includes at least one of an identifier of the wireless network, an encryption key associated with the wireless network, and a password associated with the wireless network. The first control module uses the configuration data to establish the connection with the wireless network.

17 Claims, 4 Drawing Sheets

SENDING DIGITAL DATA VISUALLY USING MOBILE DISPLAY AND CAMERA SENSOR

FIELD

The present disclosure relates to configuring a camera to connect to a home network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In a wireless local area network (WLAN) such as a home network, the network implements a Wi-Fi network or another mechanism to wirelessly connect one or more devices. For example, the WLAN may include an access point that connects the devices to the Internet or other wide area network (WAN). The devices may include, but are not limited to, a desktop personal computer, a laptop computer, one or more computer peripherals, a video game console, and/or a mobile device such as a smartphone or a tablet personal computer. The devices may also include a camera or other device that includes a camera sensor, such as a camera that streams video data to the personal computer and/or the Internet over the WLAN.

Typically, a device must be configured (e.g., by a user) to connect to the WLAN. For example, the user may input configuration data to the device. The configuration data may include, but is not limited to, a name or other identifier of the WLAN (e.g., a service set identifier, or SSID), a security key, and/or a password. For example only, the security key may include a Wi-Fi protected access (e.g., WPA or WPA2) security key. The device connects to the WLAN using the configuration data.

SUMMARY

A system for establishing a connection between a first device and a wireless network includes a first control module, located on the first device, that receives encoded digital data. The encoded digital data corresponds to a plurality of images displayed sequentially on a display of a second device. Each of the plurality of images corresponds to a different portion of the encoded digital data. A decoder module, located on the first device, converts the encoded digital data into configuration data. The configuration data includes at least one of an identifier of the wireless network, an encryption key associated with the wireless network, and a password associated with the wireless network. The first control module uses the configuration data to establish the connection with the wireless network.

A system for establishing a connection between a first device and a wireless network includes a first control module, located on a second device, that receives configuration data. The configuration data includes at least one of an identifier of the wireless network, an encryption key associated with the wireless network, and a password associated with the wireless network. An encoder module, located on the second device, converts the configuration data into encoded digital data. The encoded digital data corresponds to a plurality of images. Each of the plurality of images corresponds to a different portion of the encoded digital data. A display sequentially displays the plurality of images.

A method for establishing a connection between a first device and a wireless network includes receiving encoded digital data using the first device, wherein the encoded digital data corresponds to a plurality of images displayed sequentially on a display of a second device, and wherein each of the plurality of images corresponds to a different portion of the encoded digital data, converting the encoded digital data into configuration data, wherein the configuration data includes at least one of an identifier of the wireless network, an encryption key associated with the wireless network, and a password associated with the wireless network, and using the configuration data to establish the connection with the wireless network.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Devices in a secured or unsecured wireless local area network (WLAN) connect to an access point of the WLAN using configuration data. For example, in a secured WLAN, the configuration data may include a name or other identifier of the WLAN (e.g., a service set identifier, or SSID), a security key, and/or a password. In an unsecured WLAN, the configuration data may only include the name or other identifier of the WLAN.

The configuration data is provided to the device to enable the device to connect to the WLAN. For example, if the device includes a user interface, a user may input the configuration data to the device using the user interface. If the WLAN includes a personal computer (PC) or other computing device with a user interface, the user may connect the device (e.g., via a wired or wireless connection) to the PC and input the configuration data to the device using the user interface of the PC.

Some devices, such as a camera or another device with a camera sensor, may not include a user interface suitable for providing the configuration data to the device. Or, the camera may include a user interface for providing the configuration data, but the user may wish to avoid the inconvenience of using the user interface. Further, the WLAN may not include a device such as a PC to facilitate inputting the configuration data to the camera, or the PC may not be available for connecting to the camera. In a camera configuration system according to the present disclosure, a mobile device converts the configuration data into visually encoded digital data. The mobile device displays the encoded digital data using a display of the mobile device. For example, the mobile device displays the encoded digital data as a sequence of solid colors. A camera receives the encoded digital data using a camera sensor. The camera decodes the encoded digital data into the configuration data and connects to a WLAN using the configuration data.

Figure 1:
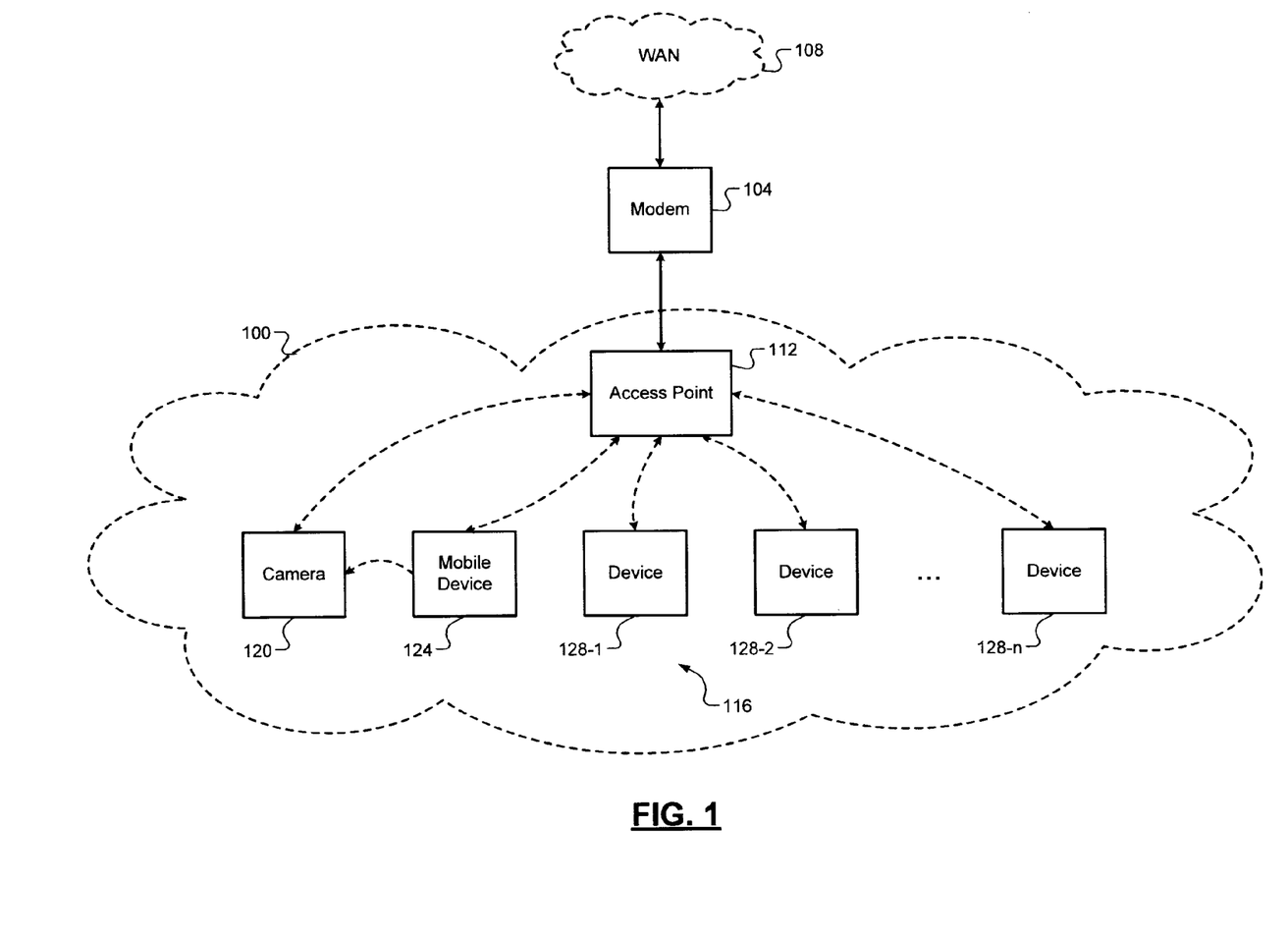
FIG. 1 is a functional block diagram of a wireless local area network according to the principles of the present disclosure.

Referring now to FIG. 1, a WLAN 100 connects to a WAN 104 such as the Internet using a modem 108. The WLAN 100 includes an access point (AP) 112, such as a wireless router, and a plurality of devices 116. The devices 116 include, but are not limited to, a camera 120, a mobile device 124, and other devices 128-1, 128-2, ..., 128-n, referred to collectively as other devices 128. The camera 120 may be a web camera that collects and streams video data wirelessly to the AP 112 to be communicated to the WAN 104. The mobile device 124 may be a smartphone (or other mobile phone), tablet PC, an electronic reader, or any other mobile device having a display. The other devices 128 may include, but are not limited to, a desktop PC, a laptop PC, computer peripherals, and a video game console.

The devices 116 in the WLAN 100 are shown connected to the AP 112 in an infrastructure wireless mode. Each of the devices 116 may be connected individually to the AP 112. For example only, a user may provide configuration data to each of the devices 116 via respective user interfaces of the devices 116. If the WLAN 100 is secured, the configuration data may include an SSID, a security key, and/or a password. If the WLAN 100 is unsecured, the configuration data may include a name or other identifier of the WLAN 100 so the devices 116 can identify the desired network to connect to. Each of the devices 116 communicates with the AP 112 using the configuration data to establish a wireless connection with the WLAN 100. Although the WLAN 100 is shown with the devices 116 connected in an infrastructure wireless mode, one or more of the devices 116 may be connected in an ad hoc wireless mode. Further, any of the devices 116 may include a wired connection to the AP 112 in addition to or instead of the wireless connection.

In some circumstances one of the devices 116 may not include a user interface suitable for inputting the configuration data to the device 116, or may include a user interface but the user wishes to avoid the inconvenience of using the user interface. Accordingly, the device 116 may be connected to a PC or other device via a wired connection such as a universal serial bus (USB) connection. The user may then input the configuration data to the device 116 using the PC. Further, the device 116 may include an access point or other wireless communication structure to establish a separate wireless connection to another one of the devices 116. In this manner, another one of the devices 116 may be used to provide the configuration data.

If one of the devices 116 does not include an access point, the WLAN 100 does not include a PC or other device, and/or the user wishes to avoid the inconvenience of connecting the device 116 to the PC, providing the configuration data to the device 116 may be problematic. For example, the camera 120 may be a web camera that does not include an access point and a suitable user interface for inputting configuration data. However, the mobile device 124 or one of the devices 128 having a display may be used to provide the configuration data to the camera 120.

In particular, the mobile device 124 may be, for example only, a smartphone or tablet PC that has a display. The AP 112 may provide the configuration data to the mobile device 124 via the wireless connection if the mobile device 124 is wirelessly connected to the AP 112. Alternatively or additionally, if the mobile device 124 is not wirelessly or otherwise connected to the AP 112, the user may obtain the configuration data from the AP 112 or another device (e.g., using a PC) and manually input the configuration data to the mobile device 124 using a user interface of the mobile device 124.

The mobile device 124 converts the configuration data into visually encoded digital data. For example, the encoded digital data includes a sequence of different colors displayed individually (e.g., one color at a time) on the display of the mobile device 124. In other words, each color may represent a different portion of the visually encoded digital data For example, the mobile device 124 displays a first color indicating a first portion (e.g., a first bit or sequence of bits of digital data) of the encoded digital data for a first period, then displays a second color indicating a second portion (e.g., a second bit or sequence of bits of digital data) of the encoded digital data for a second period, and continues displaying different colors until the entire sequence of encoded digital data is displayed. For example only, the mobile device 124 displays each color in the sequence one at a time, each for a predetermined period. The mobile device 124 may repeat the display of the encoded digital data as necessary. Further, the display of the encoded digital data may include clock data. For example, brightness levels of the display and/or an amount of time each color is displayed may be indicative of clock timing associated with the encoded digital data. In other implementations, each color may be displayed on and off at a predetermined frequency for a first period before switching to the next color. The frequency of the display of each color may also be indicative of the clock timing.

When the camera is ready to receive the configuration data, the mobile device 124 is arranged such that the display of the mobile device 124 faces a camera sensor of the camera 120. For example, the user may hold the mobile device 124 next to the camera 120 with the display of the mobile device 124 facing the camera sensor. Accordingly, the camera 120 captures and stores the sequence of colors using the camera sensor. The camera 120 decodes the sequence of colors into the configuration data that was originally input to the mobile device 124. The camera 120 can then use the configuration data to join the WLAN 100.

Although FIG. 1 is described with respect to the camera 120, a device other than the camera 120 may receive the configuration data from the mobile device to join the WLAN 100. For example, one of the devices 128 may be another device with a camera sensor, such as another mobile device or a handheld video game device. Further, one of the devices 128 may be a printer or all-in-one device that includes a scanner that can receive the configuration data. Accordingly, any device including image sensing structure may be used to detect the configuration data to join the WLAN 100.

Figure 2:
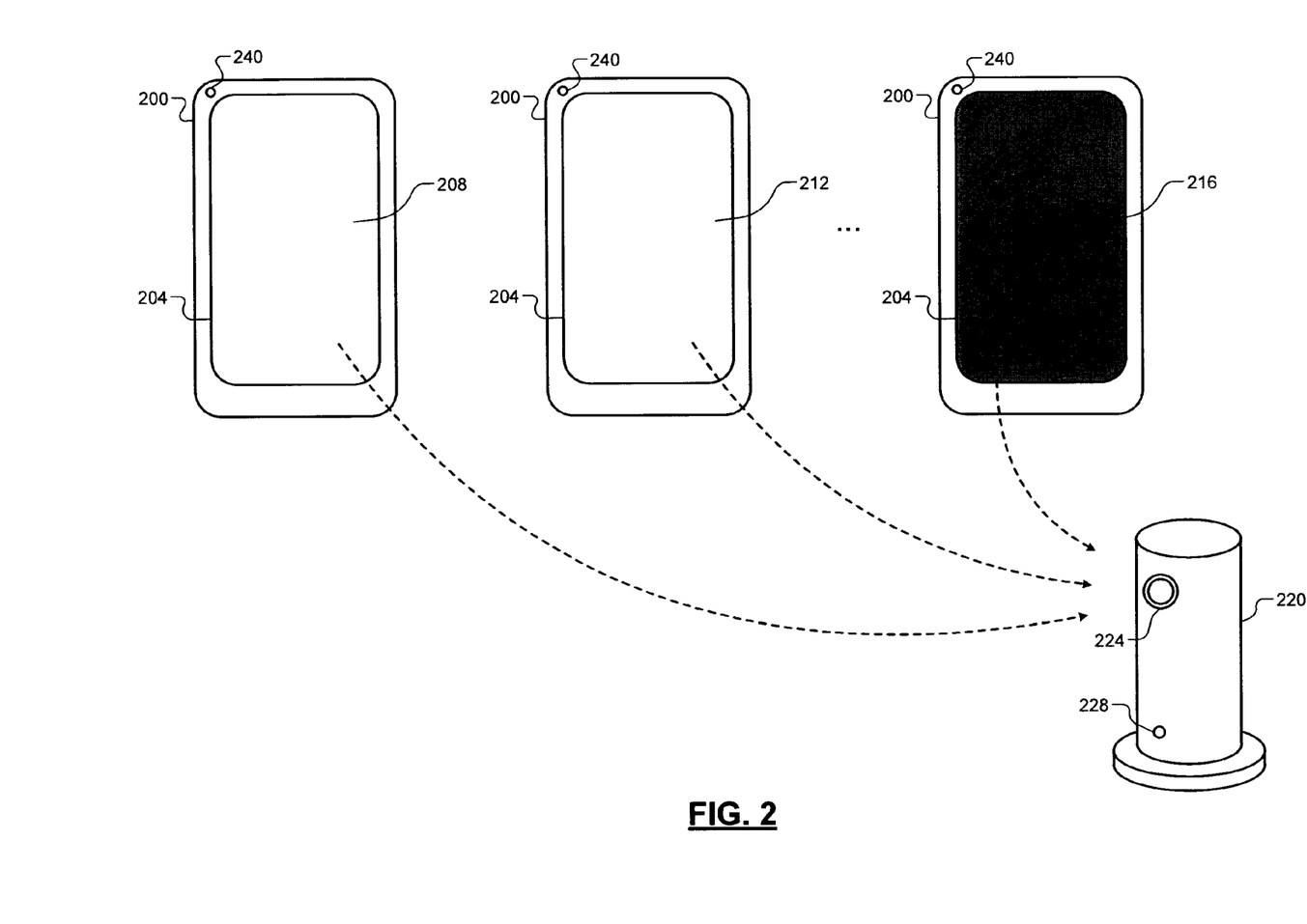
FIG. 2 illustrates a camera configuration system according to the principles of the present disclosure.

Referring now to FIG. 2, a mobile device 200 is shown in sequence displaying, using a display 204, a first color 208, a second color 212, and an nth color 216 corresponding to the encoded digital data. For example only, each of the colors in the sequence, when displayed, may fill the entire display 204. Although the mobile device 200 is shown displaying n colors, other numbers of colors could be used. For example only, in some implementations, the mobile device 200 displays more than 2 different colors in a sequence. Conversely, in other implementations the mobile device 200 displays only a first color and a second color to represent binary digital data. The mobile device 200 may be configured to convert the configuration data into the encoded digital data and display the encoded digital data using application software. For example, the application software may be third party software obtained via purchase or download.

A camera 220 includes a camera sensor 224 and one or more visual status indicators such as a light emitting diode (LED) 228. The camera sensor 224 captures the sequence of colors displayed by the mobile device 200 and the camera 220 stores and decodes the sequence of colors into the configuration data. For example, the camera sensor 224 captures a first color in the sequence and stores a first digital value based on the first color, then captures the second color and subsequent colors accordingly. Because only one color is displayed at a time using the mobile device 200, limitations due to a resolution of the camera sensor 224 are minimized. The camera 220 uses the configuration data to connect to the WLAN 100.

The LED 228 may indicate a status of the camera 220. For example, the LED 228 may indicate that the camera 220 is ready to receive the configuration data or that the camera 220 has successfully connected to the WLAN 100. For example only, the LED 228 may flash red when the camera 220 is ready to receive the configuration data. The camera 220 may be ready to receive the configuration data in a setup mode. For example, the camera 220 may automatically enter the setup mode when powered on and upon detection of a wireless network, or may enter the setup mode in response to the user pressing a setup button. Conversely, the LED 228 may flash green when the camera 220 has successfully connected to the WLAN 100. The mobile device 200 may be operated according to the status of the camera 220. For example, when the camera 220 is ready to receive the configuration data, the user may press a setup button on the mobile device 200. The mobile device 200 begins displaying the sequence of different colors representing the configuration data in response to the user pressing the setup button. The mobile device 200 may repeatedly display the sequence until the LED 228 indicates that the camera 220 successfully joined the WLAN 100 and the user terminates the sequence by pressing another button on the mobile device 200. Alternatively or additionally, once connected to the WLAN 100 the camera 220 may communicate with the mobile device 200 wirelessly to terminate the sequence.

The mobile device 200 may display the colors based on one or more criteria including, but not limited to, ambient lighting conditions, manufacturer or design specifications for the mobile device 200, and/or manufacturer or design specifications for the camera 220. For example, if the mobile device 200 includes a camera sensor 240, the camera sensor 240 can detect the ambient lighting conditions. The mobile device 200 may include a plurality of color sets associated with different levels of ambient light. For example, some colors may not be as easily detected by the camera sensor 224 of the camera 220 in certain lighting conditions. Accordingly, the mobile device 200 may select a color set to represent the encoded digital data that does not include those colors. Further, some cameras 220 may detect certain colors more accurately than others. For example, a resolution of the camera sensor 224 may determine the ability of the camera 220 to detect certain colors. Accordingly, the user may provide the model/type or manufacturer of the camera 220 to the mobile device 200. Accordingly, the mobile device 200 may select a color set suitable for use with the camera 220 based on the model/type or manufacturer.

For example only, under some lighting conditions or for some cameras, the mobile device 200 may select a color set that uses eight or more different colors to represent the configuration data. For example, each of 8 colors may represent 3 bits of binary data (e.g., a digital value) ranging from 000 to 111, where a first color represents 000, a second color represents 001, and an eighth color represents 111. Conversely, each of 16 colors may represent 4 bits of binary data ranging from 0000 to 1111. Different color sets may use different combinations of colors for the 8 or 16 colors, and may include different shades of grayscale. Under other lighting conditions or for other cameras, the mobile device 200 may select a color set that uses fewer than eight colors. For example, a color set may include only 2 colors, where one color represents a binary 0 and another color represents a binary 1. In any implementation, certain colors or digital values may represent control data. For example, the control data may indicate a beginning or end of the sequence, clock timing associated with the encoded digital data, and/or error correction data associated with encoded digital data.

Although the mobile device 200 is shown as, for example only, a smartphone or tablet PC, any device having a display can be used to display encoded digital data. For example, if the camera 220 is used with a video game console connected to a television, the television display can be used to provide the encoded digital data to the camera 220. Further, if the WLAN 100 includes a desktop or laptop PC and the user simply does not wish to provide the configuration data to the camera 220 manually, the display of the desktop or laptop PC can be used to provide the encoded digital data to the camera 220.

Further, although the mobile device 200 is described as displaying the encoded digital data as a sequence of colors displayed one at a time on the display 204, other suitable implementations of the encoded digital data may be used. For example, the encoded digital data may include, but is not limited to, a QR code, a high capacity color code, a bar code, or a simple pattern. For example, the simple pattern may include two or more colors in a checkerboard pattern, a striped pattern, or simply two or more solid colors instead of one solid color. For example only, the simple pattern may be a sequence of simple patterns displayed one at time, such as a solid single color, two solid colors, a checkerboard pattern, and/or a striped pattern. Each pattern may represent a different digital value similar to the colors in a color set as described above. The encoded digital data may also include typed or handwritten text (e.g., displayed on the mobile device 200 and/or typed/written on paper or another medium).

In some implementations, the encoded digital data may also include audio encoded digital data. For example, the audio encoded digital data may include dual-tone multi-frequency (DTMF) signals or any other audio signals output from a speaker of the mobile device 200 and received by a microphone and associated processing on the camera 220. In other implementations, the camera 220 may include voice recognition capabilities, and the user my input the configuration data via voice commands to the camera 220.

The mobile device 200 may be configured to select which implementation of the encoded digital data to display based on one or more criteria, such as the ambient lighting conditions, manufacturer or design specifications of the camera 220, and/or user preference. For example, QR codes, high capacity color codes, bar codes, and other complicated images require a camera 220 having a higher resolution or additional circuitry, ideal lighting conditions, and/or other environmental or equipment features in order to accurately detect the encoded digital data. Accordingly, the mobile device 200 may determine the ambient lighting conditions and capabilities of the camera 220 based on, for example, manufacturer and/or design specifications for the camera 220. For example only, a user may input information about the camera 220, or select the type the camera 220 from a list or database that is stored on the mobile device 200 or otherwise available to the mobile device 200 (e.g., available via download or remote access).

The mobile device 200 may select between, for example, the sequence of solid color images, the simple pattern, the QR codes, and/or any other suitable implementation (e.g., including various types of audio data) based on the type of camera 220 and detected ambient lighting or other conditions. For example, if the camera sensor 224 is a high resolution camera and the camera 220 includes appropriate circuitry, the mobile device 200 may select and display a QR code or high capacity color code based on the configuration data. Conversely, if the camera 220 does not have appropriate circuitry or suitable a camera sensor having a suitable resolution, the mobile device 200 may select and display a sequence of solid colors or a simple pattern based on the configuration data. Accordingly, the mobile device 200 can display a plurality of different visually encoded digital data implementations based on different camera types and/or different environmental conditions.

Figure 3:
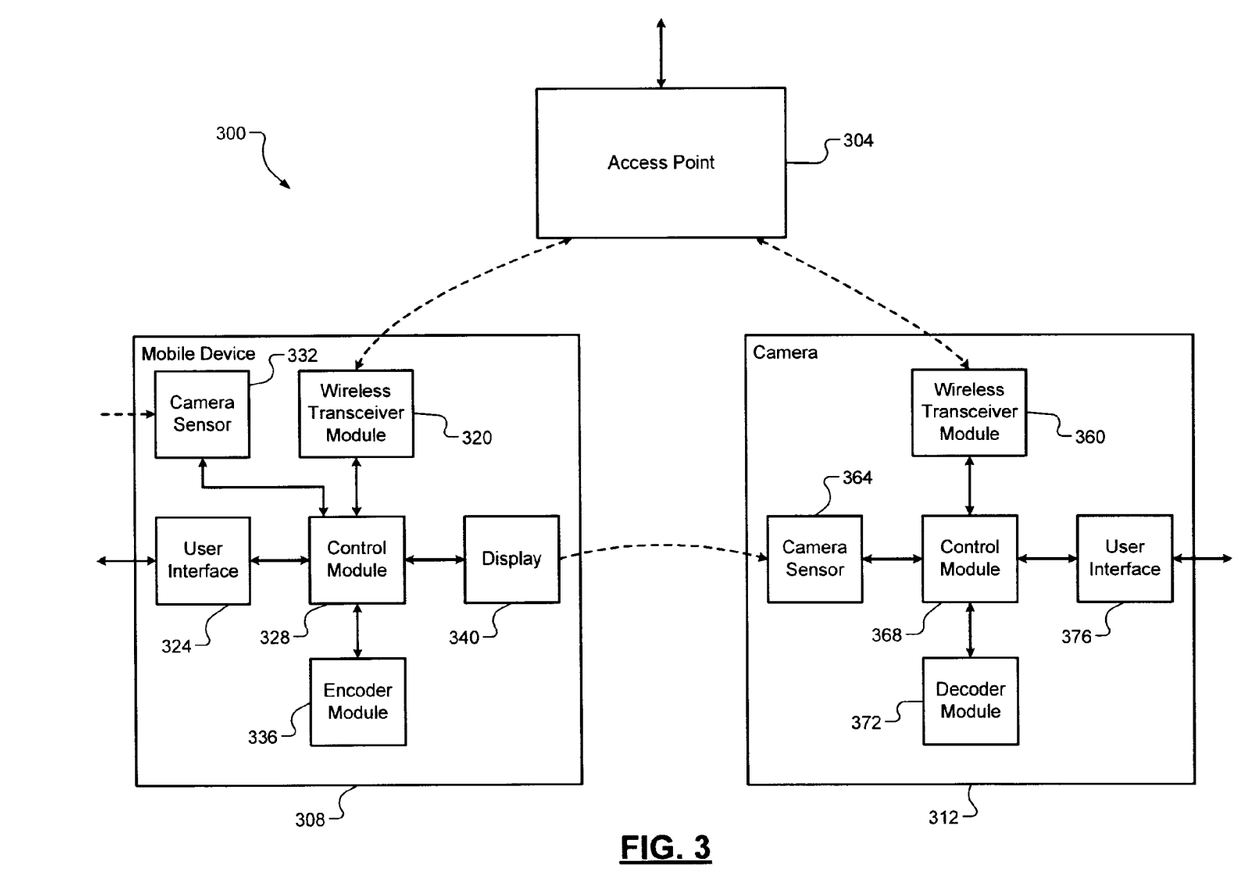
FIG. 3 is a functional block diagram of a mobile device and a camera according to the principles of the present disclosure.

Referring now to FIG. 3, a WLAN 300 includes an AP 304, a mobile device 308, and a camera 312. The mobile device 308 includes a wireless transceiver module 320, a user interface 324, a control module 328, a camera sensor 332, an encoder module 336, and a display 340. The mobile device 308 communicates with the AP 304 over the WLAN 300 to establish a wireless connection using the wireless transceiver module 320. The wireless transceiver module 320 may receive the configuration data from the AP 304, and may receive an indication from the AP 304 that the camera 312 has successfully connected to the WLAN 300. A user interacts with the mobile device 308 using the user interface 324. For example, the user interface 324 includes, but is not limited to, buttons, a keyboard, a microphone, and a touchscreen interface. The user may input the configuration data or other information (e.g., to initiate setup of the camera 312 using the configuration data, to provide details about the camera 312, or to indicate that the camera 312 has successfully connected to the WLAN 300) to the mobile device 308 using the user interface 324.

The control module 328 receives the configuration data via the wireless transceiver module 320 and/or the user interface 324. The control module 328 may also receive additional information related to the configuration data and the camera 312. For example, the camera sensor 332 may detect ambient lighting conditions and provide information about the ambient lighting conditions to the control module 328. The control module 328 provides the configuration data and any other relevant information to the encoder module 336. For example, the control module 328 may select a color set or a desired implementation of the encoded digital data based on the configuration data, the ambient lighting conditions, and/or details of the camera 312 (e.g., manufacturer or model information of the camera 312).

The encoder module 336 converts the configuration data to the visually encoded digital data. For example, the encoder module 336 converts the configuration data into a sequence of different colors to be displayed by mobile device 308. The encoder module 336 provides the encoded digital data to the control module 328. The control module 328 outputs the encoded digital data to the display 340. The display 340 displays the encoded digital data as a sequence of colors representing the configuration data. The camera 312 captures and stores the encoded digital data.

The camera 312 includes a wireless transceiver module 360, a camera sensor 364, a control module 368, a decoder module 372, and a user interface 376. The camera 312 communicates with the AP 304 over the WLAN 300 to establish a wireless connection via the wireless transceiver module 360 using the configuration data received from the mobile device 308. For example, the camera sensor 364 receives the encoded digital data from the mobile device 308 by capturing the sequence of colors displayed on the display 340. The camera sensor 364 provides the encoded digital data to the control module 368. The control module 368 provides the encoded digital data to the decoder module 372. The decoder module 372 converts the decoded digital data to the configuration data needed to connect to the WLAN 300 and provides the configuration data to the control module 368.

The control module 368 uses the configuration data to establish a wireless connection with the WLAN 300. For example, the control module 368 selects a network to connect to based on a name or identifier of the WLAN 300 included in the configuration data, and provides any required encryption keys or passwords to the AP 304 using the wireless transceiver module 360. Once the wireless connection is established, the control module 368 may provide an indication that the camera 312 successfully connected to the WLAN 300 to the user interface 376. The user interface 376 may visually indicate that the wireless connection is establish. For example, the user interface 376 may include an LED. The user interface 376 may include other interface elements such as a power button.

Figure 4:
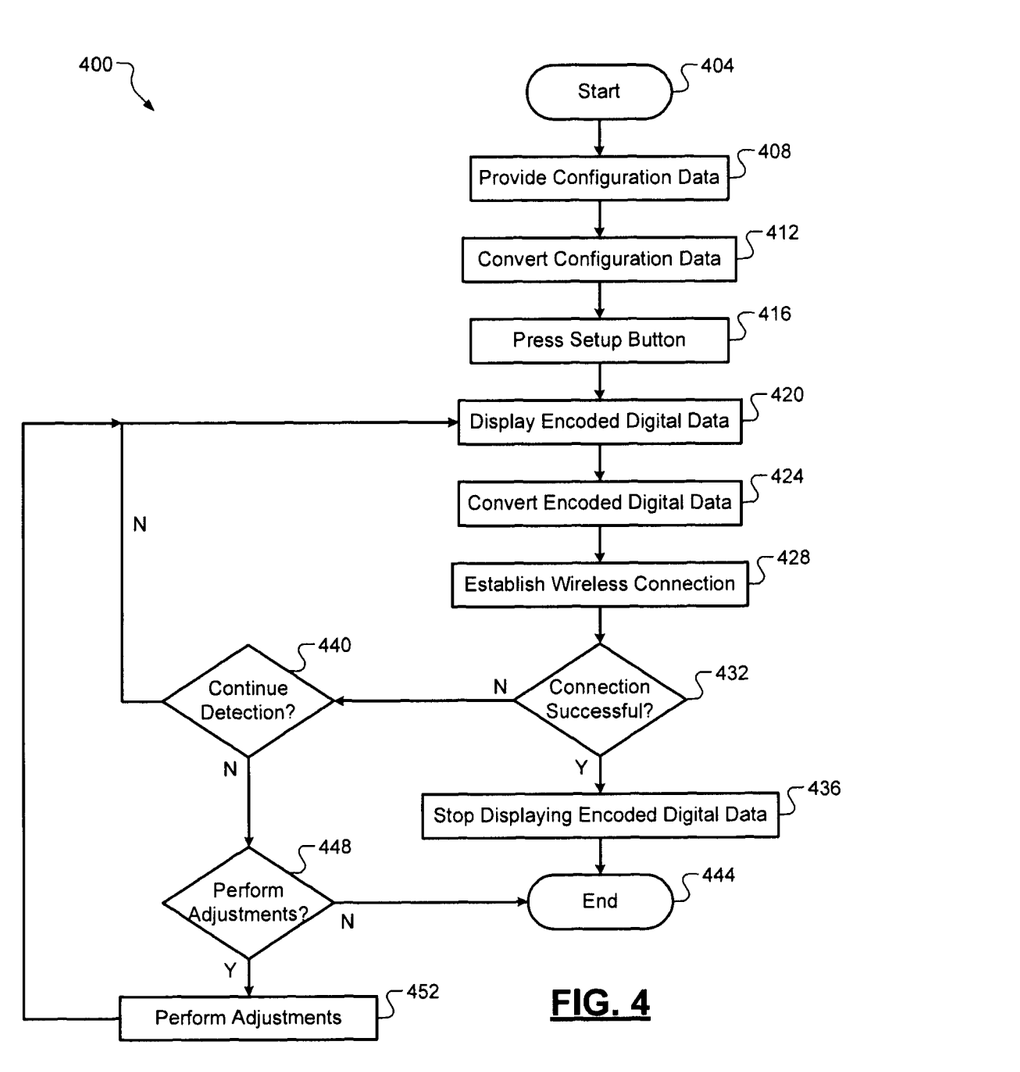
FIG. 4 illustrates a camera configuration method according to the principles of the present disclosure.

Referring now to FIG. 4, a camera configuration method 400 begins at 404. At 408, configuration data for establishing a connection with a WLAN is obtained and provided to a mobile device. For example only, the mobile device receives the configuration data wirelessly from an AP or a user manually inputs the configuration data. At 412, the mobile device converts the configuration data into visually encoded digital data. For example, the mobile device converts the configuration data based on a selected color set, ambient light conditions, and/or manufacturer or model information of a camera. At 416, the user provides an indication that the camera is ready to receive the configuration data. For example, the user may press a setup button on the mobile device in response to an indication from the camera that the camera is ready to receive the configuration data.

At 420, the mobile device displays the encoded digital data (e.g., as a sequence of colors). At 424, the camera detects the encoded digital data and converts the encoded digital data into configuration data. At 428, the camera establishes a wireless connection with the WLAN using the configuration data. At 432, the camera determines whether the connection with the WLAN is successful. If true, the method 400 continues to 436. If false, the method 400 continues to 440. At 436, the mobile device stops displaying the encoded digital data. The method 400 ends at 444.

At 440, the method 400 determines whether to continue attempting to detect the configuration data with the camera using current settings. For example only, the method 400 may continue attempting to detect the configuration data for a first period (e.g., until timers associated with one or both of the mobile device and the camera reach a predetermined value), or for a predetermined number of times (e.g., until the mobile device displays the encoded digital data the predetermined number of times). If true, the method 400 continues to 420. If false, the method 400 continues to 448. At 448, the method 400 determines whether to perform adjustments to the mobile device and/or the camera. For example, the method 400 may perform adjustments a predetermined number of times and/or until timers associated with one or both of the mobile device and the camera reach a second predetermined value. If true, the method 400 continues to 452. If false, the method 400 ends at 444.

At 452, the method 400 performs one or more adjustments to at least one of the mobile device and the camera. For example, if the detection of the configuration data has not been successful (e.g., due to corrupted configuration data or unsuitable ambient lighting conditions) the mobile device and/or the camera may take one or more remedial actions. The remedial actions include, but are not limited to, adjusting parameters of the camera sensor (e.g., to compensate for the lighting conditions) and selecting a different implementation for displaying the encoded digital data. For example, selecting a different implementation for displaying the encoded digital data includes, but is not limited to, selecting a different color set, switching between one or more visual implementations (e.g., the sequence of colors, QR codes, etc.). In some implementations, selecting the different implementation may include switching between visual implementations and non-visual implementations (e.g., audio encoded digital data).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system for establishing a connection between a first device and a wireless network, the system comprising:
    a first electronic circuit, located on the first device, configured to receive encoded digital data, wherein the first device includes a camera, wherein the encoded digital data corresponds to a plurality of images displayed sequentially, at different times, on a display of a second device, wherein each of the plurality of images includes a single solid color, wherein each solid color represents a different portion of the encoded digital data, and wherein the display of the second device displays a first solid color indicating a first portion of the encoded digital data for a first predetermined period and then displays a second solid color that indicates a second portion of the encoded digital data for a second predetermined period; and
    a second electronic circuit, located on the first device, configured to convert the encoded digital data into configuration data, wherein the configuration data includes at least one of an identifier of the wireless network, an encryption key associated with the wireless network, and a password associated with the wireless network,
    wherein the first electronic circuit is configured to use the configuration data to establish the connection with the wireless network.

2. The system of claim 1 wherein each of the different portions of the encoded digital data includes an N bit digital value, and wherein N is greater than or equal to one.

3. The system of claim 1 further comprising a camera sensor that detects the plurality of images and outputs the encoded digital data to the first electronic circuit based on the plurality of images.

4. The system of claim 1 further comprising a wireless transceiver, located on the first device, that receives the configuration data from the first electronic circuit and communicates with an access point of the wireless network to establish the connection using the configuration data.

5. The system of claim 1 further comprising a visual indicator located on the first device, wherein the visual indicator indicates when the connection is established with the wireless network.

6. The system of claim 1 wherein the encoded digital data is further based on at least one of ambient light conditions, a manufacturer of the first device, and a type of the first device.

7. The system of claim 1 further comprising:
    the first device; and
    the second device, the second device comprising:
    a third electronic circuit configured to receive the configuration data;
    a fourth electronic circuit configured to convert the configuration data into the encoded digital data; and
    the display.

8. The system of claim 7 wherein the second device includes at least one of a mobile phone, a tablet personal computer, and an electronic reader.

9. A system for establishing a connection between a first device and a wireless network, wherein the first device includes a camera, the system comprising:
    a first electronic circuit, located on a second device, configured to receive configuration data, wherein the configuration data includes at least one of an identifier of the wireless network, an encryption key associated with the wireless network, and a password associated with the wireless network;
    a second electronic circuit, located on the second device, configured to convert the configuration data into encoded digital data, wherein the encoded digital data corresponds to a plurality of images, wherein each of the plurality of images includes a single solid color; and
    a display that sequentially displays, at different times, the plurality of images, wherein each solid color represents a different portion of the encoded digital data, and wherein the display displays a first solid color indicating a first portion of the encoded digital data for a first predetermined period and then displays a second solid color that indicates a second portion of the encoded digital data for a second predetermined period,
wherein the configuration data is used by the first device to establish the connection with the wireless network.

10. The system of claim 9 wherein each of the different portions of the encoded digital data includes an N bit digital value, and wherein N is greater than or equal to one.

11. The system of claim 9 further comprising a wireless transceiver, located on the second device, that receives the configuration data from an access point of the wireless network and outputs the configuration data to the first electronic circuit.

12. The system of claim 9 further comprising a user interface located on the second device, wherein the user interface receives the configuration data.

13. The system of claim 9 wherein the first electronic circuit is configured to provide the configuration data to the second electronic circuit based on at least one of ambient light conditions, a manufacturer of the first device, and a type of the first device.

14. The system of claim 9 further comprising:
the first device; and
the second device,
wherein the first device includes a third electronic circuit configured to receive the encoded digital data;
a fourth electronic circuit configured to convert the encoded digital data into the configuration data; and
a wireless transceiver that establishes the connection with the wireless network using the configuration data.

15. The system of claim 14 wherein the first device is a camera and the second device is at least one of a mobile phone, a tablet personal computer, and an electronic reader.

16. The system of claim 14 wherein the first device includes a camera sensor that detects the plurality of images and outputs the encoded digital data to the third electronic circuit based on the plurality of images.

17. A method for establishing a connection between a first device and a wireless network, the method comprising:
receiving encoded digital data using the first device, wherein the first device includes a camera, wherein the encoded digital data corresponds to a plurality of images displayed sequentially, at different times, on a display of a second device, wherein each of the plurality of images includes a single solid color, wherein each solid color represents a different portion of the encoded digital data, and wherein the display of the second device displays a first solid color indicating a first portion of the encoded digital data for a first predetermined period and then displays a second solid color that indicates a second portion of the encoded digital data for a second predetermined period;
converting the encoded digital data into configuration data, wherein the configuration data includes at least one of an identifier of the wireless network, an encryption key associated with the wireless network, and a password associated with the wireless network; and
using the configuration data to establish the connection with the wireless network.

* * * * *